US010013396B2

(12) United States Patent
Horn et al.

(10) Patent No.: US 10,013,396 B2
(45) Date of Patent: Jul. 3, 2018

(54) MODIFYING NATIVE DOCUMENTS WITH FORMULAS IN A PREVIEW

(71) Applicant: Dropbox, Inc., San Francisco, CA (US)

(72) Inventors: Daniel Horn, Palo Alto, CA (US); Adhiraj Somani, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 459 days.

(21) Appl. No.: 14/609,111

(22) Filed: Jan. 29, 2015

(65) Prior Publication Data

US 2016/0224517 A1 Aug. 4, 2016

(51) Int. Cl.
*G06F 17/00* (2006.01)
*G06F 17/21* (2006.01)
*G06F 17/24* (2006.01)
*G06F 17/22* (2006.01)
*H04L 29/08* (2006.01)

(52) U.S. Cl.
CPC ........ *G06F 17/212* (2013.01); *G06F 17/2288* (2013.01); *G06F 17/246* (2013.01); *H04L 67/02* (2013.01)

(58) Field of Classification Search
CPC ... G06F 17/212; G06F 17/246; G06F 17/2288
See application file for complete search history.

(56) References Cited

U.S. PATENT DOCUMENTS

| | | | | |
|---|---|---|---|---|
| 6,988,241 | B1* | 1/2006 | Guttman | G06F 17/246 707/E17.115 |
| 2002/0082857 | A1* | 6/2002 | Skordin | G06F 17/243 705/1.1 |
| 2005/0050088 | A1* | 3/2005 | Kotler | G06F 17/245 |
| 2007/0233811 | A1 | 10/2007 | Rochelle et al. | |
| 2010/0174783 | A1* | 7/2010 | Zarom | G06F 9/526 709/205 |
| 2012/0110515 | A1* | 5/2012 | Abramoff | G06F 17/30994 715/854 |

FOREIGN PATENT DOCUMENTS

WO WO 01/98928 A2 12/2001

OTHER PUBLICATIONS

PCT International Search Report and Written Opinion, PCT Application No. PCT/IB2016/050479, dated Apr. 5, 2016, 11 pages.

* cited by examiner

*Primary Examiner* — Stephen S Hong
*Assistant Examiner* — Marshon L Robinson
(74) *Attorney, Agent, or Firm* — Fenwick & West LLP (57) ABSTRACT

A document preview system provides previews of a native document to client devices. To generate the preview of a document, the document preview system generates a preview document that presents the native document in a browser-compatible format including elements that correspond to fields in the native document. The document preview system also identifies a mapping between fields of the native document and the elements of the preview. The document preview system also identifies a formula listing for the elements of the preview code. When a user edits a document, the edits may be committed to the document preview system and in parallel generate a preview to update the user's display. When an updated preview is available, the updated preview is rendered in a hidden frame and the user's input context is captured and reproduced when the updated preview replaces the prior preview.

27 Claims, 10 Drawing Sheets

Native Document Values
300

| | A | B | C | D | E | F |
|---|---|---|---|---|---|---|
| 1 | | | | | Interest Rate | 10% |
| 2 | | 1 | | Compounding | | |
| 3 | | 1 | | 100 | | |
| 4 | | 2 | | 110 | | |
| 5 | | 3 | | 121 | | |
| 6 | | 5 | | 133 | | |
| 7 | | 8 | | 146 | | |
| | | 13 | | | | |

Native Document Formula
310

| | A | B | C | D | E | F |
|---|---|---|---|---|---|---|
| 1 | | | | | Interest Rate | 10% |
| 2 | | 1 | | Compounding | | |
| 3 | | 1 | | 100 | | |
| 4 | | =B1+B2 | | =D3+D3*$F1 | | |
| 5 | | =B2+B3 | | =D4+D4*$F1 | | |
| 6 | | =B3+B4 | | =D5+D5*$F1 | | |
| 7 | | =B4+B5 | | =D6+D7*$F1 | | |
| | | =B5+B6 | | | | |

Fig. 4

Native Document
400

|   | A | B | C | D | E | F |
|---|---|---|---|---|---|---|
| 1 | A1 | | C1 | D1 | | |
| 2 | | | C2 | D2 | E2 | F2 |
| 3 | | | | D3 | E3 | F3 |

Preview Code Formatting
410

|   | A | B | C | D | E | F |
|---|---|---|---|---|---|---|
| 1 | [0,0] {rowspan=3; colspan=2} | | [0,1] | [0,2] {colspan=3} | | |
| 2 | | | [1,0] {rowspan=2} | [1,1] | [1,2] | [1,3] |
| 3 | | | | [2,0] | [2,1] | [2,2] |

MODIFYING NATIVE DOCUMENTS WITH FORMULAS IN A PREVIEW

BACKGROUND

This disclosure relates generally to previewing documents, and in particular to viewing and editing a document from a document preview.

Online content management systems enable users to store documents online where they may be accessible by many different users and by different devices. These systems further enable users to view stored documents in a preview mode, which is typically a rendered image displayed in browser or other viewing application. While previews can be generated, for example, by converting the document to a printed page or other static preview, editing these documents through the preview is a challenge. Since documents cannot be edited in preview mode, the user typically must access the document in its native format using a native application appropriate for the document type. If the user does not have an appropriate native application for the document installed on her client device, they will be unable to edit the document.

SUMMARY

A document preview system stores documents in their native format and provides previews of the native documents in a non-native form, such as in a browser, to users accessing the document preview system. The document preview system permits users to view and modify the contents of the native document. The document preview system may also permit users to synchronize the native document across different user devices. A native document is a structured document with fields that include values for the field, such as a spreadsheet. A value may be defined by a formula that may reference another field in the native document.

To provide document previews, the document preview system generates a preview document of the native document. The preview document provides instructions for a client device to render the preview document, such as through an HTML file or other file type readable by a browser. The preview document includes preview code, a field mapping, and a formula listing. The preview code specifies the code for interpretation by the browser to generate the preview of the native document. As an example of the preview code, when the preview document is an HTML file, the preview code includes a <table> tag. The field mapping designates a translation between fields in the native document and a specific element in the preview code. A formula listing indicates which fields in the native document are associated with formulas and for each such field, the formula that defines the value for that field. In one embodiment the formula listing is integrated into the preview code, such that the formulas in the listing are associated with the element as designated by the field mapping. The field mapping and formula listing permit a client device to display the preview document with an indication of the native document fields and any related formulas. The preview document is provided to the client device for display to the user of the client device.

At the client device, the browser interprets the preview document to provide a preview to the user. The browser may also execute additional code, such as JavaScript or another language interpreted within the browser for displaying and manipulating the preview. The native document values are displayed to the user within the preview in the elements designated by the preview code. A user may select an element to view and/or edit. When the user selects an element, the formula associated with that element is displayed to the user. The user may modify the element, for example by entering a new value or by entering a formula to define the value. When the element is modified, any entered formula must be evaluated, and other fields within the document may be affected, such as those fields that reference the modified field. Additional components, such as charts or graphs, may also be affected. Since the preview document is shown in a browser, the browser may not be able to directly update the preview with the modification.

To update the native document and the preview, the client device identifies one or more fields changed by the user in the preview and generates a change list that specifies the identified field and the user's change, and sends the changed value or formula to the document preview system to modify the synchronized native document. In addition, the client device may generate a temporary document for displaying the modifications prior to the modification of the synchronized native document. To generate the temporary document, the client device modifies the contents of the preview of the native document, for example as stored at the client device, or from the document preview system. The modification made by the user is applied to the copy of the preview document and an updated temporary preview document is generated from the modified copy. This parallel process permits the client device to provide the modifications to the native document to the user prior to the changes being committed to the document preview system.

When an update to the preview document is received by the client device, such as from the document preview system or to a copy, the updated preview document is displayed to the user. To smooth the transition between the display of the original document version to the modified version, the client device renders the updated preview to a hidden portion of the screen, such as a hidden iframe. Prior to displaying the updated preview, the client device identifies a current context of user's interaction with the preview, such as the user's cursor location, and any selection of portions of the preview. The updated preview is swapped for the preview in the display and the current context of the user's interaction is duplicated in the updated preview when the updated preview is displayed. This can be performed within a single refresh cycle of the browser's display system, making it appear as though the action was performed on a local document.

By updating a copy of the native document, without delaying for the synchronized copy to update, and maintaining the context for a user across the updated preview, the client device is able to provide a seamless experience for the user to modify a native document within a browser.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
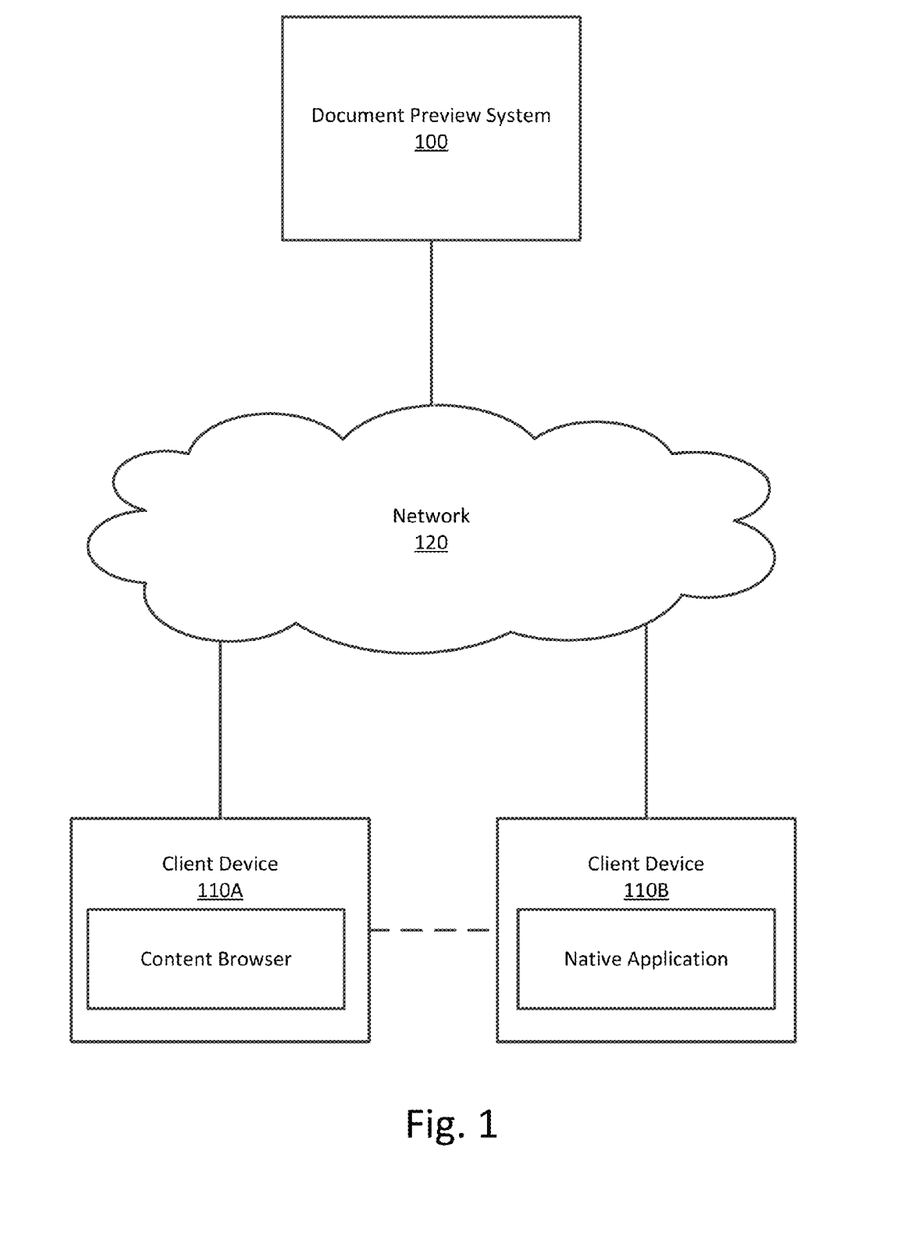
FIG. 1 shows an embodiment of an environment for presenting document previews using a task management with a content management system.

FIG. 1 shows an embodiment of an environment for presenting document previews with document preview system 100. FIG. 1 includes client devices 110A and 110B (referred to generally as client device 110), document preview system 100, and network 120. Two client devices 110 are shown only for purpose of illustration; in practice any number of client devices may be present in the environment. Similarly, other modules or components described and illustrated throughout may include single or multiple instances as appropriate to the needs of the implementer and without loss of generality.

Document preview system 100 stores native documents and provides native documents and previews of the native documents to client devices 110. A native document is a document created using an application program and that uses particular formatting and rendering functionality of the application program for its display on client device 110. The data in the native document is typically structured, for example providing specific locations and designations for data in the native document. One example of a native document is a spreadsheet as generally shown throughout, though other types of native documents that have fields defined by formulas may also be used, such as forms, presentations, and data tables.

A native document includes one or more fields defining the location of data within the structured document, for example a specific cell in a spreadsheet such as B8 or A3. Each field may include a value, which may be a formula that references another field in the native document. For example, the value at cell A5 may be defined by a formula referencing cell A4: "A5=A4+5". Thus, each cell may reference one or more additional fields in a formula, which may themselves reference another field, meaning that modifying one field's value may affect many additional fields.

Figure 3:
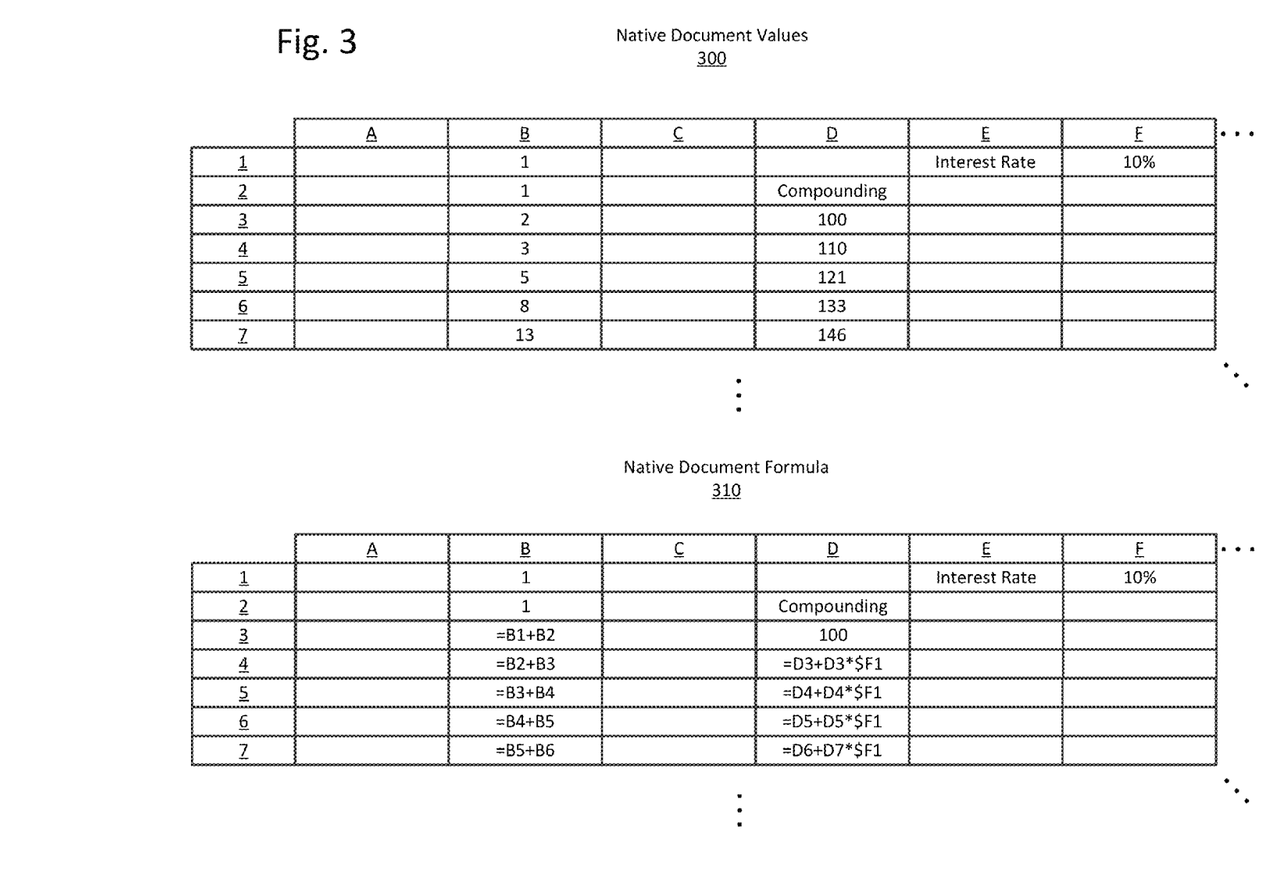
FIG. 3 shows an example of native document values and associated formulas according to one embodiment.

FIG. 3 shows an example of native document values and associated formulas according to one embodiment. In this example, native document values 300 show the values associated with individual fields in the native document. For example, field B1 has the value "1," field B6 has the value 8, and D2 has the text value "Compounding." As shown by the associated native document formulas 310, for certain fields, there is no formula, such as fields B1, B2, D2, E1, and so forth. For other fields, such as fields B3 through B7, the field is associated with a formula that generates the value for a field. In this example, fields B3-B7 show the Fibonacci sequence by adding the value of the two fields above it. Similarly, D4-D7 show formulas for 10% compounding interest applied to a field above the current field. When stored in the native document, the formulas may be expressly associated with each field, or the formulas may be listed with respect to one source field, with an instruction to replicate the formula to further fields. For example, the formulas in B3-B7 may be stored in the native document as the formula in B3 as a source field with an instruction to "fill down" the formula to additional fields—without expressly listing the specific fields and the formulas for those fields. In these "fill-down" formulas, a formula specifies the source field and a range of additional fields to which the formula applies. The formula itself may reference another field in its calculation. The referenced field in the formula may also be modified based on the specific field in the range of fields to which the formula applies. For example, the formula in field B3 may reference field E3. The formula in this example may apply to the range of additional fields B4-B10. When the formula is applied to fields B4-B10, the referenced field also increments with the formula, such that the formula for field B4 references field E4, the formula for field B5 references field E5, and so on. Within the native document, these formulas may be designated by the formatting of the reference to the field in the source field.

Returning to FIG. 1, these native documents may be stored as a local copy of the document on a client device 110 or may be processed at client device 110 and remotely stored at the document preview system 100. The document preview system 100 provides a preview document of the native document to client devices 110 for display to a user. The preview document is a display of the native document in the client device 110 and may be in another file format from the native document, such as in a hypertext markup language (HTML) or other language interpreted by a browser, and may include a scripting language such as JavaScript.

As described more fully below, the preview document includes preview code, a field mapping, and a formula list. The preview code designates the values and display characteristics of the native document. For example, the preview code may designate a table containing the values of the native document, including height and width dimensions of the elements in the table. The height and width dimensions format the elements to match the size of fields in the native document. An element designates a specific slot or location in the preview code in which data (e.g., values and formulas) may be placed. In this example, the table is a <table> tag in HTML formatting including elements making up the table. Each element in the table is related to a field in the native document. A field mapping specifies, for each field in the native document, which element in the table corresponds to that field. For example, for a field A3 in the native document, the field mapping indicates that it corresponds to table element 5 in the table. In one example, rather than being a component of the native document, the field mapping may be generated when required by preview system 100 or client device 110 based on height and width dimensions for the elements in the table. The preview document also includes a formula listing that designates which fields in the native document are associated with formulas and for each such field, the formula that defines the value for that field. The formulas generated for a table in one embodiment are inserted into table elements as invisible <div> elements. In another embodiment, the formulas are maintained in the formula listing and are not directly inserted into the table elements. For example, the formulas may be saved in HTML metadata as a JavaScript Object Notation (JSON) mapping from cell coordinate to formula text.

Figure 4:
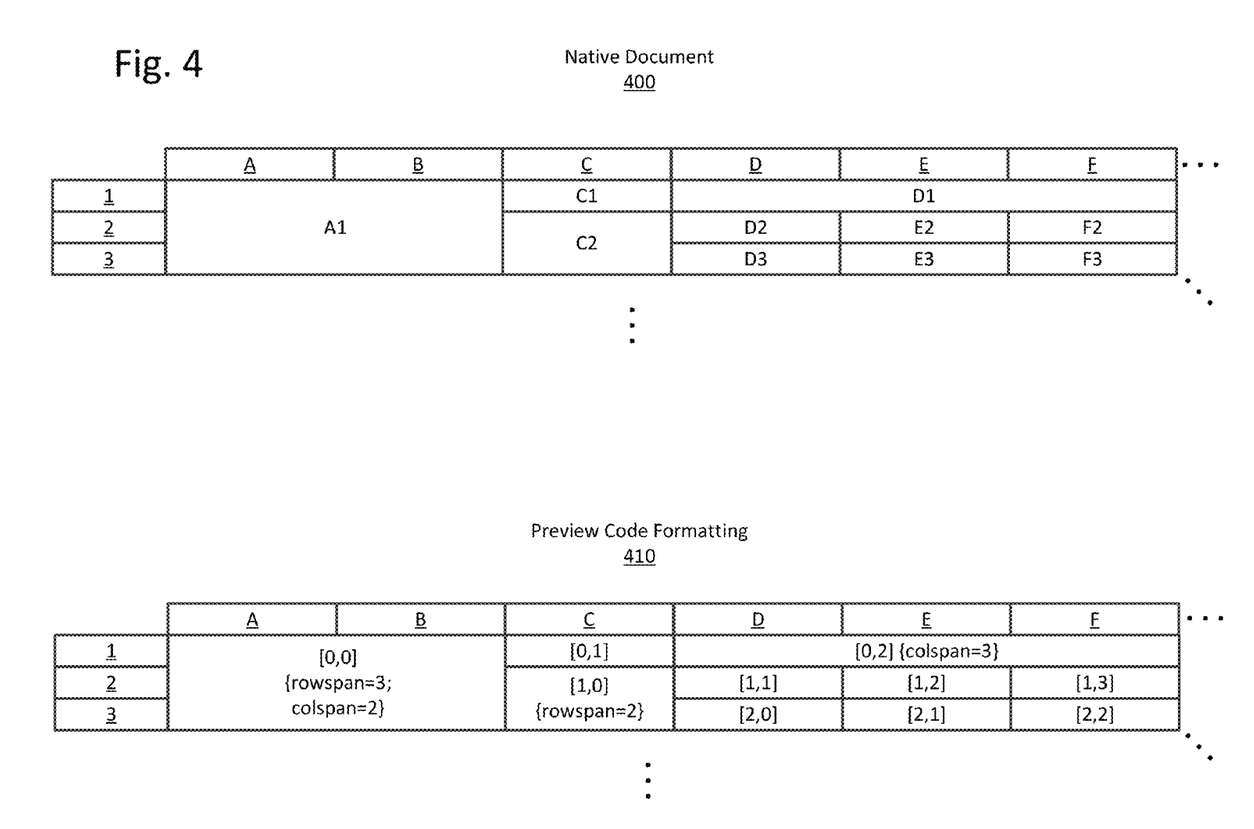
FIG. 4 shows the fields in a native document 400 and the related elements in a preview of that native document according to one embodiment.

FIG. 4 shows the fields in a native document 400 and the related elements in a preview of that native document according to one embodiment. As shown in FIG. 4, the native document may have various fields that have been "merged" together in the native document. In this example, A1, A2, A3, B1, B2, and B3 are merged together into a single field. Similarly, D1, E1, and F1 have also been merged, as have C2 and C3. When converted to preview code formatting 410, the combined rows and columns are converted into elements of the table. These elements are designated [0,0], [0,1], etc. Rather than designating the specific field of an element, in one embodiment the elements of the preview code formatting are designated by the height and width dimensions of the element. In this example, element [0,0] is designated as including three rows and two columns in the preview code. As shown in FIG. 4, the sequential elements of the preview code may not directly correspond to the native document 400. Thus, field mapping describes the correspondence between fields in the native document 400 and the elements in the table to be generated by the preview code. In this example, field D3 in the native document corresponds to the element [2,0] in the preview code as shown rendered here.

Thus, document preview system 100 stores documents and provides document previews to client devices 110. Document preview system 100 provides a preview of a native document to permit an operator of client device 110 to view the preview prior to (or in lieu of) accessing and modifying the native document. In the preview of the native document, the document preview system 100 provides the preview to the client device 110 and permits users to enter modifications to the preview on the client device 110. The document preview system 100 stores modifications to the native document and synchronizes such modifications with other client devices 110, such that these modifications are viewable and modifiable by a native document application that accesses the native document.

Client device 110 may be any suitable computing device for viewing and modifying documents stored at document preview system 100. Client devices 110 may also synchronize documents that are locally stored at client device 110 with document preview system 100. When documents are synchronized, changes or modifications to a document at client device 110 are transmitted to document preview system 100 and reflected in the document stored at document preview system 100 and vice versa. In some embodiments of document preview system 100 and the document preview techniques disclosed herein, documents are not synchronized. In other embodiments, features of document preview system 100 are performed at client device 110 to provide previews to other client devices 110, without a centralized document preview system 100. Examples of devices include desktop and laptop computers, hand-held mobile devices, tablet computers, and other computing devices. The operation of client device 110 in various embodiments is further described below.

Client devices 110 also execute various applications and other executable programs. As shown in FIG. 1, client device 110A includes a content browser application and client device 110B includes a native document application, though client devices 110 may include either or both of these applications, among other applications and features of client device 110. A content browser accesses previews of a native document from document preview system 100 and displays the previews to the user. A typical content browser is a web browser that interprets a mark-up and/or scripting language to provide a display to the user, though various other types of browsers may be implemented as the content browser, for instance a viewer in a native mobile application. In addition, the browser as described herein may be used to view documents stored at the client device. In this example, the client device may implement aspects of the document preview system for generating preview documents used by the browser. The content browser may also receive instructions from the document preview system for modifying the native document within a preview of the native document. The display and modification of a native document is further disclosed below. The modification of the preview is transmitted to the document preview system 100 for incorporation into the native document.

The native document application creates and modifies native documents on client device 110. Such native document applications include productivity applications such as, spreadsheet applications, presentation applications, as well as other applications according to the type of native document modified by client device 110. When client device 110 is synchronized with document preview system 100, modifications to the native document performed by the native document application are synchronized to document preview system 100.

Each client device 110 communicates with document preview system 100 through network 120. Network 120 is any suitable network and may include local networks, corporate networks, global networks, and any combination of these. In typical configurations, client devices 110 communicate via a wired or wireless communication network to a local network service provider, and communicate with document preview system 100 through the Internet. In certain configurations, client devices 110A and 110B communicate directly with one another without network 120 as indicated in FIG. 1 by dashed lines. For example, devices 110 may communicate via a wired or wireless connection, such as wirelessly via a Bluetooth connection or a wired connection via a Universal Serial Bus (USB).

Figure 2:
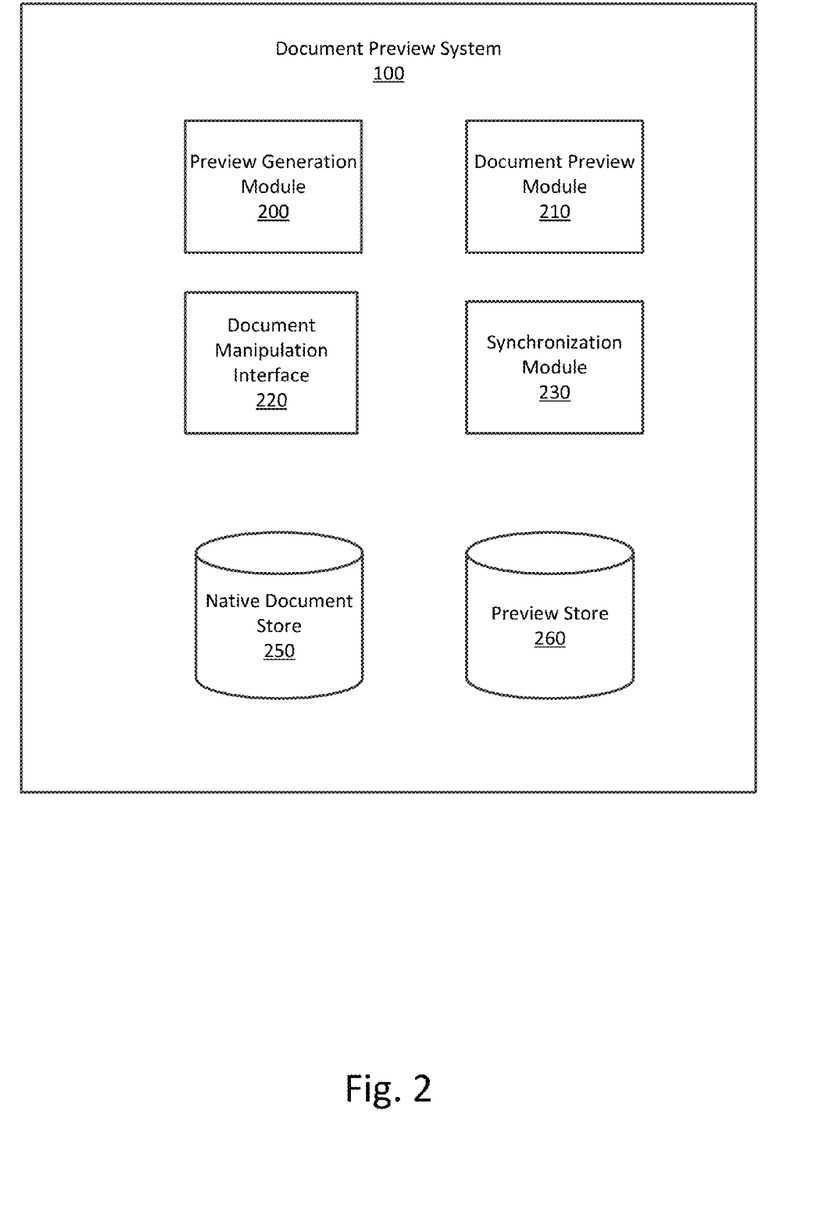
FIG. 2 shows components of document preview system according to one embodiment.

FIG. 2 shows components of document preview system 100 according to one embodiment. Document preview system 100 includes various modules and data stores for providing previews to client devices 110. Such modules include preview generation module 200, document preview module 210, document manipulation interface 220, and synchronization module 230. Data stores included in this embodiment are native document store 250 and preview store 260.

To preview a given native document, preview generation module 200 generates a preview document, which includes data for a client device 100 to display the native document in a browser, including the preview code, field mapping, and formula listing as indicated above. When a native document is stored at the document preview system 100 at the native document store 250, the preview generation module 200 prepares the preview document. To prepare the preview document, the preview generation module 200 analyzes the native document to output the preview code for the document. The native document is also analyzed by a height and width parser implemented by the preview generation module 200 to determine the field mapping for the native document fields to the preview code elements. In addition, the preview generation module 200 generates a formula listing that specifies the formulas for each field in the native document. To generate the formulas for a field, the preview generation module 200 expands any "fill down" formulas that to determine the specific formula for each field in the range of formulas. To expand the formula, the preview generation module 200 determines the source field and determines whether the formula references a field for its calculation and if so, whether the referenced field is incremented within the range of additional fields based on the position of the field in the range of fields. When the formula references additional fields, a formula is generated for the formula listing that specifies the formula using the incremented field applicable to each formula within the range of fields. These expanded formulas are stored as the formula listing for the native document and specify the formula applicable to a field in the native document. Using the field mapping, the formula listing can be applied to the elements specified in the preview code. The preview generation module 200 stores the generated preview documents in preview store 260.

Native document store 250 stores native documents. Preview store 260 stores generated preview documents associated with the native documents.

Document manipulation interface 220 is an interface for manipulating and parsing native documents in native document store 250. In certain embodiments, the native documents are maintained in proprietary formats or otherwise difficult to directly manipulate. The document manipulation interface 220 provides an application programming interface for various modules to interact with the native documents 250. Document manipulation interface 220, for example, receives instructions to insert modifications to the native documents.

In embodiments where the native documents are synchronized with client devices 110, the synchronization module 230 manages this synchronization. When modifications are made to a native document in native document store 250, synchronization module 230 requests an updated preview from the preview generation module 200, saves the document preview in preview store 260, and disseminates the modified document to client devices 110 synchronized to the native document. If other client devices have made modifications during the same time when the preview was updated, this dissemination may be rejected by the document preview system. The client may then retry the same update, reapplying the changes to the new version. The modifications to the native document may be performed by a user modifying the document via the document preview module 210 or may be received from a client device 110 that has made a change to the native document using a native application.

Document preview module 210 provides preview documents to client devices 110. When a user requests a preview of a native document, document preview module 210 retrieves a preview document from preview store 260. The document retrieved from preview store 260 may also be associated with a version of the native document from which the preview was generated. As indicated further below, the version may be used to determine whether users are updating a native document relative to the most recent version of the document stored at document preview system 100. The requesting client device 110 receives the preview document from document preview module 210 and provides the preview document to the operator of client device 110.

Client device 110 may also provide the user with an interface to modify a value or formula in the preview. The user selects a portion of the preview and modifies a selected element in the preview using the interface. When the modification is received, client device 110 provides the modification and an identification of the field in the native document to which the modification pertains. The interface may also permit a user to add or delete a row or column of data. Client device 110 may determine the field for the modification based on the field mapping. Client device 110 may also indicate a version of the preview file that the edit is applied to by the client device 110. In certain circumstances, versions of a native document edited at different locations may have different data. In that event, the version is used to determine which edit to apply to the document. For example, an edit received by the document preview system 100 that indicates a version of the document that is older than the current version stored at the native document store 250 may not have its edits applied to the native document. Instead, the new version of the document may be retrieved by the client device from the native document store 250 and the client device may attempt to reconcile the changes and may request instructions from the user on the reconciliation if necessary. Alternatively, the system may be configured so a field is an atomic unit of data and an edit to that field replaces all text for that field by the last writer to the document. In this configuration, conflict resolution replaces the entirety of a given field with the last written value and requires no user prompting.

Figure 5:
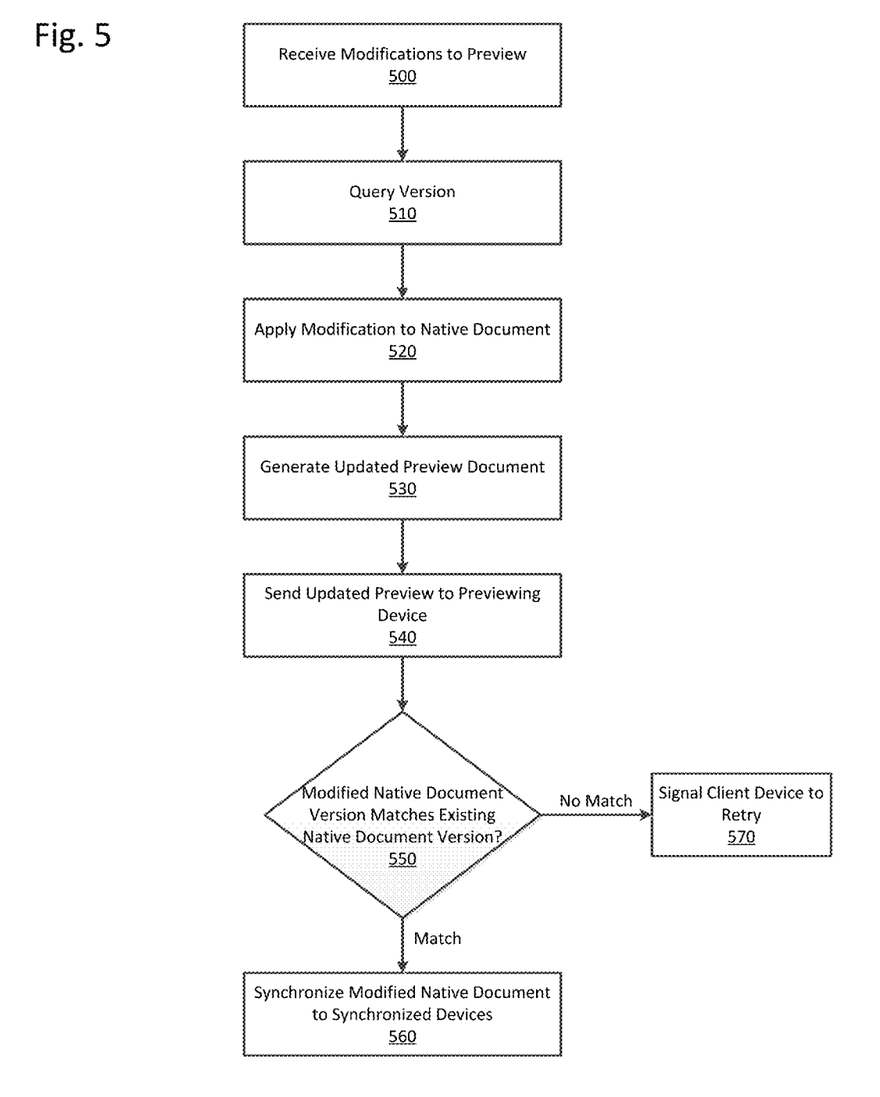
FIG. 5 shows a flowchart for modifying a native document and a preview document based on revisions received from a user.

FIG. 5 shows a flowchart for modifying a native document and a preview document based on revisions received from a user. This method may be performed by document preview system 100. Initially, a request to modify a native document is received 500 that designates a preview and a modification to make to the preview and its associated native document. The request may also designate a version of the native document associated with the modification.

Next, the version of the modified document may be verified to verify that the client device is submitting a modification of a current document. The document preview module 210 queries the version of the current document for comparison with the version of the native document stored in the native document store 250. When the version does not match, the current version of the native document may be sent to the client device to perform conflict resolution between the current version and the version to which the modification was made. This conflict resolution may also be performed on the document preview system 100 using the last writer per cell method described above or by other means. During the process of conflict resolution, a newer version of the document may be uploaded by other clients to document preview system 100. Client device 110 may receive an error code from document preview system 100 to signal a conflict between the version uploaded to the document preview system 100 and modifications being applied by the client device. Client device 110 may re-attempt to submit the modification until no error code is received.

This reconciliation may be performed using an operational transform. For example, to reconcile modifications to a column or row of the native document, client device 110 determines whether an edit to be applied was affected by the row or column modification. For example, a client device 110 may have received an edit to a field from the user, and when the client device 110 attempts to save the edit, identifies that a newer version of the document has a modification to the column or row of the native document. To apply the edit (which references an older version prior to the row/column modification), client device 110 determines whether the edit is affected by the row/column modification. The edit may be affected by being applied to an affected field, or by referencing an affected field in a formula. For example, an edit originally intended for field F8 is affected if a new column is added in between columns B and C, and the edit may now be applied to field G8 by modifying the column of the intended edit. Alternatively, if the same edit also references field K10 for a formula, that cell in the formula is identified to determine whether field K10 is affected. In this example, the field is affected and the reference in the formula is altered to reference L10 and account for the added row in the native document.

When an edit is applied to a column that was deleted by another edit, the edit may not be applied to the native document. When an edit to a field references a deleted row or column (e.g., in a formula), the edit may be altered to reference a null field, or may be altered to reference the field, if any, that replaced the deleted field. For example, if row 15 is deleted, row 16 may be renumbered to row 15 and the reference modified to the renumbered row.

In certain configurations, the version verification is omitted. Next, the modification is applied 520 to the native document, for example by document manipulation interface 220. After applying the modification, an updated preview document is generated 530 by the preview generation module 200. The updated preview document includes updated values, formulas, preview code, and so forth to update the preview with respect to the modified content item. Thus, the application of the modifications to the native document and generation of the updated preview document 530 permits the updated preview document to account for any changes to fields or graphs that are calculated using the modified field. Next, the updated preview 540 is sent to the client device 110 for display to the user.

In one embodiment, prior to saving the modified native document and notifying synchronized devices of the modification, the modified native document is again checked against the current version of the native document to determine 550 a version match. For example, the synchronized native document may have changed and a new version created while the present native document is modified 520 and an updated preview generated 530. When the versions do not match, the client device is signaled 570 to resolve the conflict with the new version at the document preview system 100.

Finally, using the modified native document, the modified native document is saved to native document store 250 and synchronized 560 to client devices via synchronization module 230 after the conflicts have been processed and no error code is generated. In this way, modifications to a native document performed by client devices may be easily incorporated into the document preview system, despite that the modifications are performed on a browser or other application that is not normally configured to manipulate the native document.

In one embodiment, the document preview module 210 generates an updated preview to the document even when the document version is not verified as being current. In this embodiment, the version of the document that is referenced by the client is retrieved and modified as requested by the client device. That modified content item is sent to the requesting client device for display to the user, permitting the user to update and revise content items that may not be fully synchronized.

Figure 6:
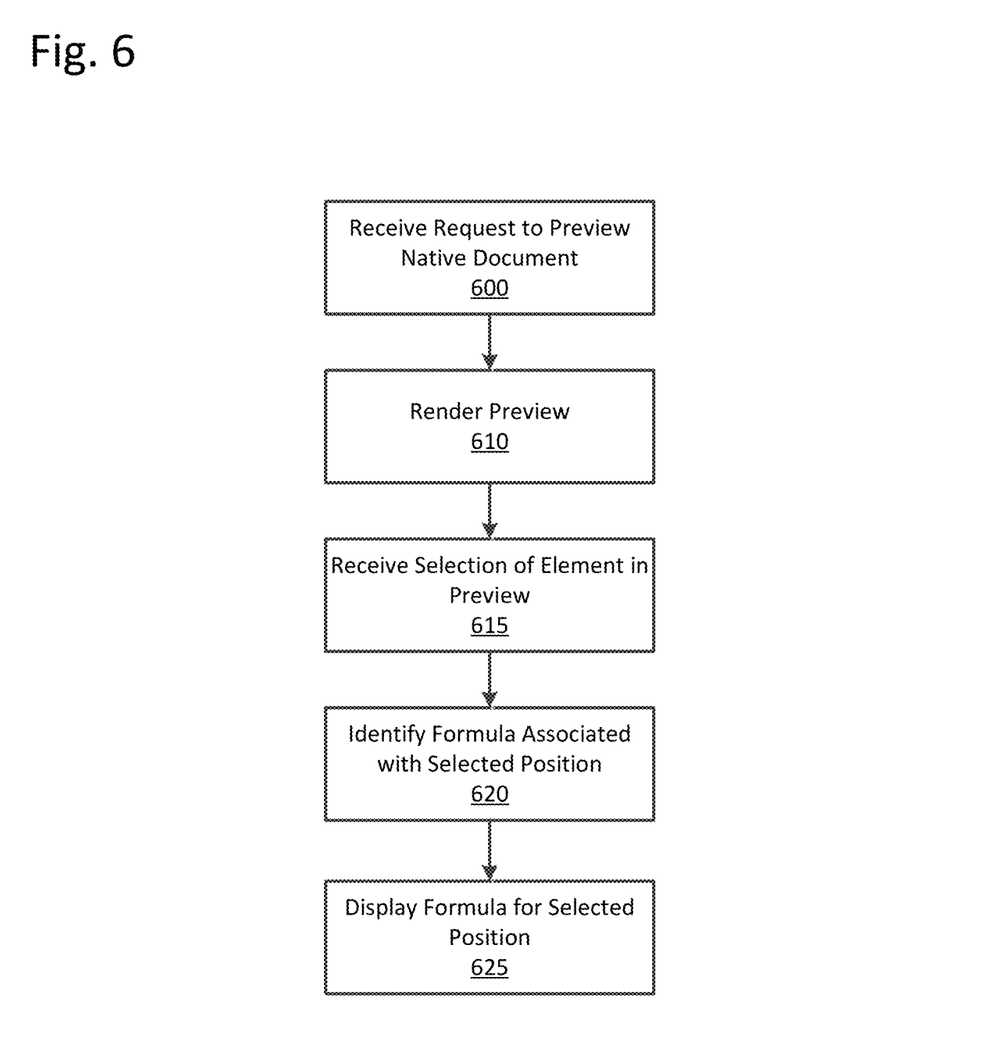
FIG. 6 shows a flowchart for receiving and displaying a preview document on a client device.

FIG. 6 shows a flowchart for receiving and displaying a preview document on a client device. The client device typically performs the method of FIG. 6 via a browser, and may execute browser-specific code to perform these actions, for example using JavaScript or another similar technology. Alternatively, the browser may be instructed to perform actions based on HTML or another similar language. The client device may also include a custom native client or execute client-specific code to perform these actions. While described herein as providing a browser to content of the document preview system 100, client device 110 may also incorporate features of document preview system 100 into the client device to provide previews and editing of native documents stored at the client device 110.

The client device 110 receives a request from a user to preview 600 a native document. The user of the client device 110 may designate the native document on a browser exploring native documents on the document preview system 100, or the client device 110 may view content items stored at the client device 110.

After requesting the preview, the client device 110 receives the preview document and renders 610 the preview document as specified by the preview document. Next, a user may select 615 an element in the preview, for example a particular cell in a table. When a user selects a cell, the client device 110 replaces the value of the cell with the formula defining the value. When there is no formula, the value itself may be displayed. To display the formula, the client device 110 identifies the formula associated with the selected field 620. In one embodiment, the formula for a field is presented as an input element associated with the element in the table. The identified formula is displayed 625 to the user.

Figure 7:
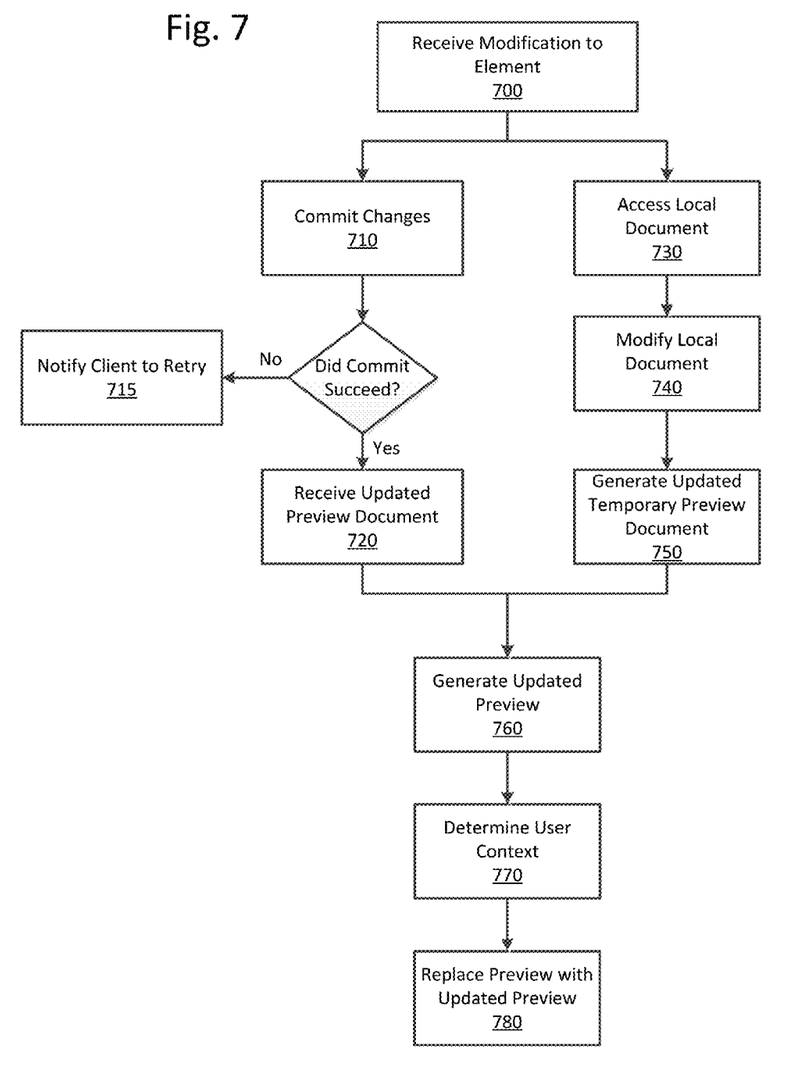
FIG. 7 shows a flowchart for managing modifications to an element in a preview.

FIG. 7 shows a flowchart for managing modifications to an element in a preview. For example, a user may select an element and modify the formula or value associated with that element. When the user modifies a value, in one embodiment the client device 110 begins two parallel paths for modifying the native document. In one path, the native document is modified and committed to the document preview system 100 for synchronization with other client devices 110, and another path provides the modified preview to the user of the client device by revising another copy of the native document that is not synchronized. By using a copy of the native document, the second path is able to display revisions more quickly to the user of the client device 110 as discussed below.

When a user modifies an element, client device 110 attempts to commit 710 the changes to document preview system 100. Client device 110 identifies an element modified by the user and an associated field in the native document. The field is identified by consulting the field mapping for the modified element. The field and its modified value are stored by the client device 110 and may be maintained until changes are successfully committed 710. The edits may also be stored as a list of changes until the commit occurs. Until the commit occurs, the client device 110 may also trigger a warning if a user attempts to browse or leave the page of the preview. Since the preview is typically presented in a browser format, leaving the browser page may cause a user's changes to the preview to fail to be committed to document preview system 100.

When the modified changes are received by document preview system 100, document system 100 applies the changes to the native document and generates an updated preview document, which is received 720 by the client device.

In addition to this path for committing changes, another method of modifying the document may be performed to improve responsiveness to the client by generating a preview and permitting a user to continue editing prior to completion of a commit to the document preview system 100 or receiving updated preview document 720. In this alternate path, the preview is modified as it would appear on the native document by applying edits and accompanying formulas to the preview. In one configuration, client devices are configured to modify a single cell edited by the user as a fast preview, while in another configuration other clients are configured to include more extensive evaluation code to apply dependent formulas to the edits using the formula list and table mapping. Furthermore, client devices 110 may also be configured to download that native document from the document preview system 100 or the client device 110 and use native code to display the updated document including updated graphs, charts, and formula values. To perform the preview at the client device 110, the client device 110 may perform functions of document manipulation interface 220 and preview generation module 200 to apply the modification to the document and generate a preview therefrom. The local version of the document is modified 740 based on the user's modifications to the element, and an updated temporary preview document is generated 750 by the client device 110.

By using both the local path and the remote path for modifying the document, the client device 110 is able to quickly present modifications to the user, and also to provide the document for a commit to the native document store 250.

When an updated preview is received by the client device 110, the updated preview may be generated in a hidden iframe. The hidden iframe permits the preview to be generated 760 and thereby rendered on a hidden (or off-screen) portion of the display of the client device 110. When the preview is completely rendered, the client device 110 determines a context of the user's interactions with the native document. The context may indicate, for example, the user's cursor position, typing characters, etc. When the client device displays the iframe, it swaps the hidden iframe with the currently shown preview and also swaps the context to the context of the user prior to replacing the preview. In this way, the amendments to a preview can be quickly and easily applied to the document within a refresh cycle to provide an interactive native-quality experience.

Figure 8A:
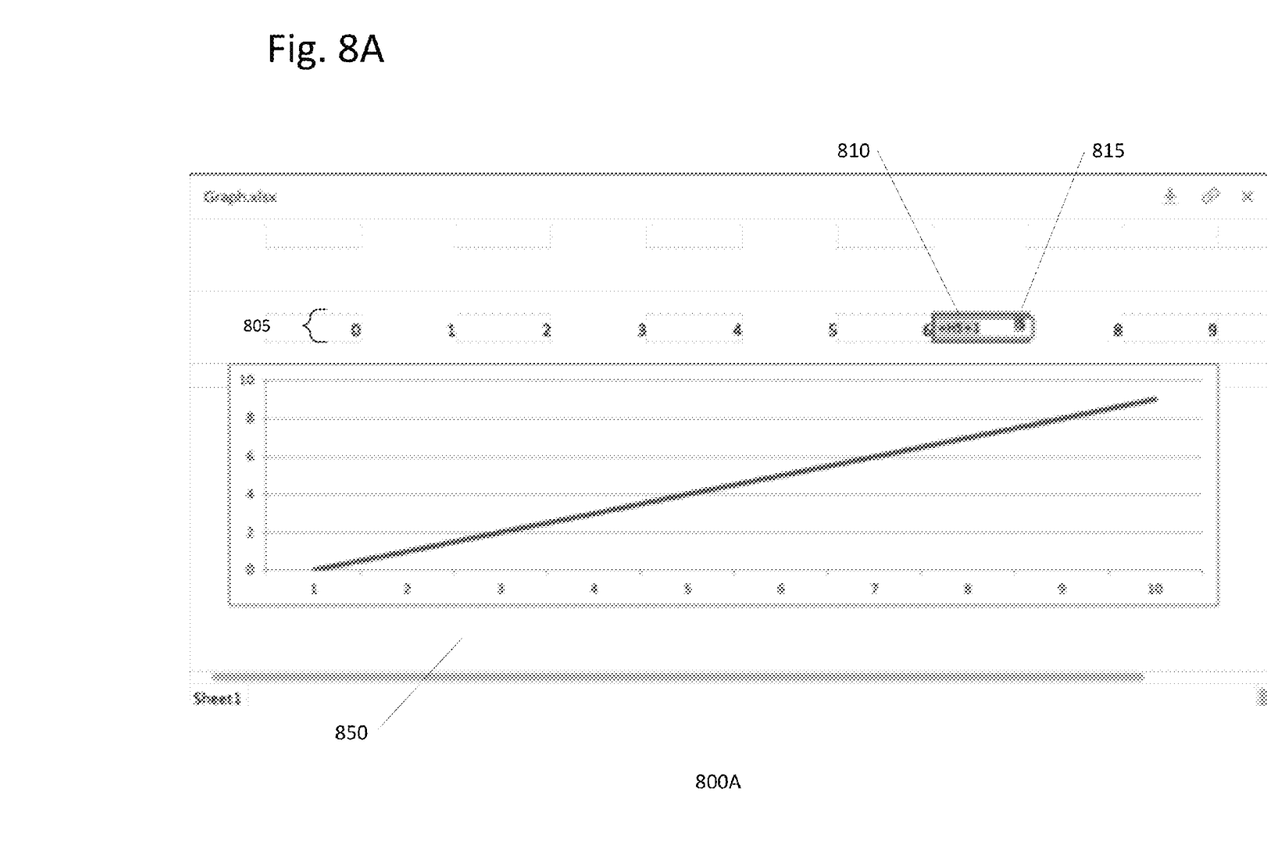
FIGS. 8A-8C show example interfaces for viewing and editing a native document using a preview in a browser.
Figure 8B:
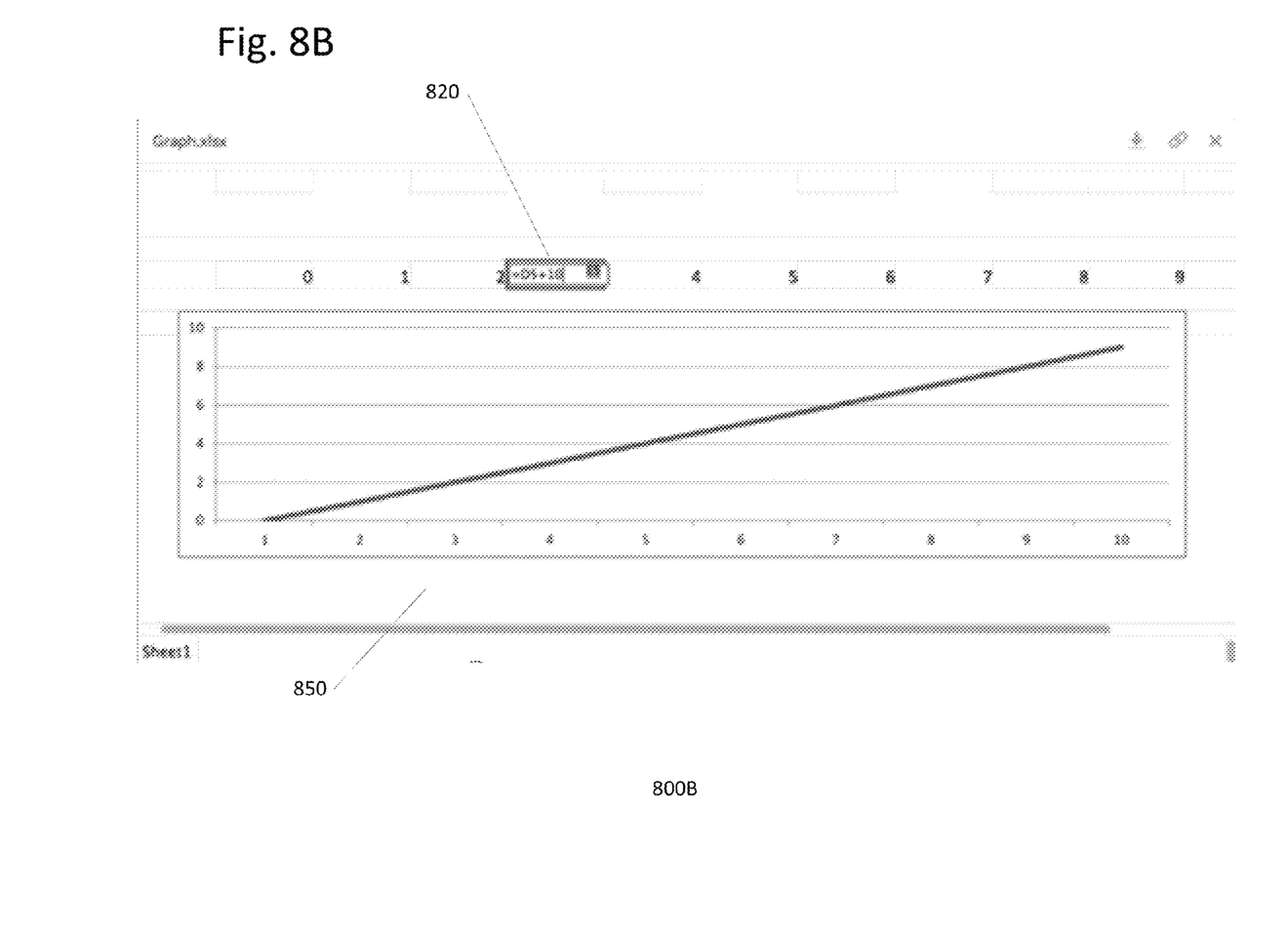
Figure 8C:
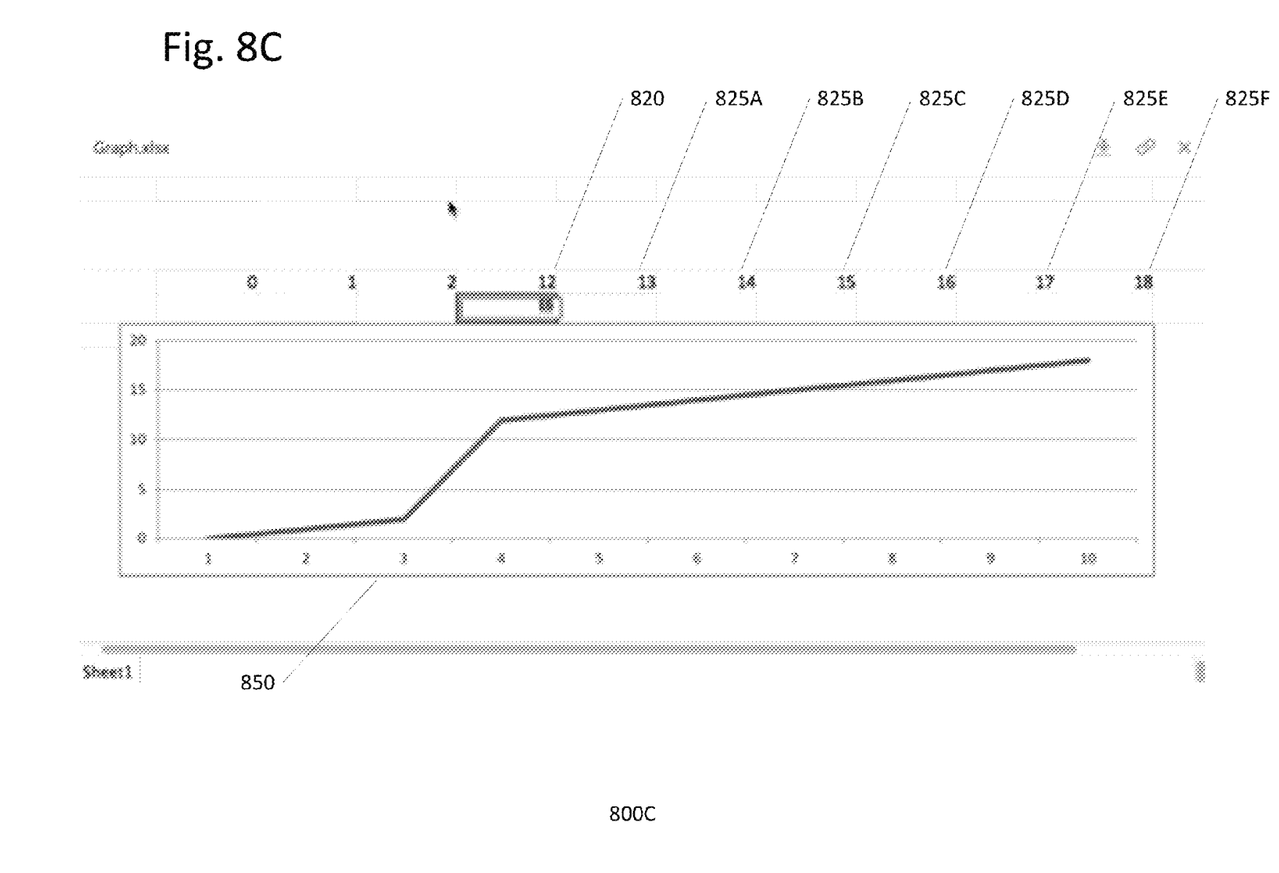

FIGS. 8A-8C show example interfaces 800A-C for viewing and editing a native document using a preview in a browser. In this example, a native document includes row 805 with values zero through 9. One element 810 is selected by the user, and upon selection the formula for that cell is displayed. In addition, the field in the native document is also displayed, in this example I5. As shown, elements in the row 805 include formulas defining the values for those fields. In this example, each of the values in the row of values is based on a formula to increment the value of the field before it. In example interface 800A, graph 850 charts values of row 805.

FIG. 8B shows modifying element 820 to affect the preview and the native document. In this example, the selected cell is modified to display a formula "=D5+10." When this revision is added, the client device 110 provides the changes to the document as discussed with respect to FIG. 7. This change may be propagated to a local copy of the document and separately committed to document preview system 100. When an updated preview is available, the updated preview is rendered in a hidden iframe and swapped to the user's display. Thus, as shown in FIG. 8C, when the native document is modified by applying the modified element, the various values that depend on that element are modified, such that graph 850 is modified, as are elements 825A-F that include formulas depending on the value of depended on the value of the modified row.

Using the techniques of this disclosure, the system may provide users with a convenient way to modify native documents within a browser. In addition, the users may modify native documents within a browser window and quickly save those modifications to the native document.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   generating a preview document of a native document comprising a preview code including table elements corresponding to fields in the native document, the native document further comprising a set of formulas, each corresponding to a respective first field of the native document and referencing a respective second field of the native document, the generating comprising:
   generating field dimensions for the fields in the native document, the field dimensions usable by a client device to compute a field mapping of fields in the native document to table elements in the preview code;
generating a formula listing designating, for each formula of the set of formulas in the native document, the respective first field corresponding to the formula and the respective second field referenced by the formula in the native document; and
storing the field dimensions and formula listing in the preview document;
displaying the preview document on a display of a first client device by executing the preview code;
generating an updated preview document in response to a change to the native document;
swapping the updated preview document with the displayed preview document; and
applying a current user interaction context to the swapped updated preview document.

2. The method of claim 1, wherein generating the formula listing comprises expanding a formula that does not list a specific formula for each field in a range of fields.

3. The method of claim 2, wherein expanding the formula comprises identifying a referenced field in the formula, and for each field in the range of fields, incrementing the referenced field in the formula based on a position of the field in the range of fields relative to a source field in the range of fields.

4. The method of claim 1, further comprising:
receiving a modification to the preview from the first client device;
applying the modification to the native document to produce a modified document;
generating an updated preview document from the modified native document; and
sending the updated preview document to the first client device.

5. The method of claim 4, wherein the native document is synchronized with a second client device, the method further comprising:
synchronizing the modified native document with the second client device.

6. The method of claim 5, further comprising:
identifying a version of the native document; and
determining whether the version of the native document matches a version associated with the modification to the preview;
wherein synchronizing the modified native document is performed after determining that the versions match.

7. The method of claim 4, wherein the native document includes a chart referencing a field modified by the modification; and applying the modification further comprises modifying the chart.

8. The method of claim 1, further comprising:
receiving a modification to the preview from the first client device specifying a modification version;
identifying a document version associated with the native document;
determining that a version conflict exists by comparing the document version differs from the modification version;
when the document version differs from the modification version, reconciling the conflict.

9. The method of claim 8, wherein the conflict is reconciled by sending an error message to the first client device.

10. The method of claim 8, further comprising identifying a row or column modification of the native document for a version of the native document corresponding to the document version relative to a version of the native document corresponding to the modification version; and
wherein reconciling the conflict comprises altering the modification based on the row or column modification.

11. The method of claim 10, wherein altering the modification comprises at least one of: altering the field of the modification and altering a referenced field in a formula in the modification.

12. A method comprising:
generating a preview document of a native document comprising a preview code including table elements corresponding to fields in the native document, the native document stored on a client device, the generating comprising:
generating field dimensions for the fields in the native document;
generating a field mapping of fields in the native document to table elements in the preview code;
generating a formula listing designating, for each formula of a set of formulas in the native document, one or more fields associated with the formula in the native document; and
displaying the preview document on a display by executing the preview code;
generating an updated preview document in response to a change to the native document;
swapping the updated preview document with the displayed preview document; and
applying a current user interaction context to the swapped updated preview document.

13. The method of claim 12, further comprising:
receiving a selection of a table element in the preview document;
identifying a formula associated with the table element based on the field mapping and the formula listing; and
displaying the formula mapped to the selected table element as an input element.

14. The method of claim 12, further comprising:
receiving a modification of a table element from the user;
determining a target field associated with the modification using the field mapping;
modifying the target field in the native document with the modification.

15. The method of claim 12, wherein swapping the updated preview document with the displayed preview document and applying the current user interaction context to the swapped preview document comprises:
rendering the updated preview document in a hidden portion of the display;
determining a context of the user's interaction with the native document as the current user interaction context;
swapping the updated preview document with the displayed preview document; and
applying the determined context to the swapped updated preview document.

16. The method of claim 12, wherein the preview document is displayed in a content item browser that is not configured to display the native document.

17. The method of claim 12, wherein each formula of the set of formulas corresponds to a respective first field of the native document and references a respective second field of the native document.

18. The method of claim 12, wherein generating the formula listing comprises expanding a formula that does not list a specific formula for each field in a range of fields.

19. The method of claim 18, wherein expanding the formula comprises identifying a referenced field in the formula, and for each field in the range of fields, incrementing the referenced field in the formula based on a position of the field in the range of fields relative to a source field in the range of fields.

20. The method of claim 12, further comprising:
receiving a modification to the preview;
applying the modification to the native document to produce a modified document;
generating an updated preview document from the modified native document; and
displaying the updated preview document on the display.

21. The method of claim 20, wherein the native document is synchronized with a second client device, the method further comprising:
identifying a version of the native document;
determining whether the version of the native document matches a version associated with the modification to the preview; and
synchronizing the modified native document with the second client device after determining that the versions match.

22. The method of claim 12, further comprising:
receiving a modification to the preview specifying a modification version;
identifying a document version associated with the native document;
determining that a version conflict exists by comparing the document version differs from the modification version; and
when the document version differs from the modification version, reconciling the conflict.

23. The method of claim 22, further comprising
identifying a row or column modification of the native document for a version of the native document corresponding to the document version relative to a version of the native document corresponding to the modification version; and
wherein reconciling the conflict comprises altering the modification based on the row or column modification.

24. A non-transitory computer-readable storage medium storing executable computer instructions that, when executed by a processor, cause the processor to perform steps comprising:
generating a preview document of a native document comprising a preview code including table elements corresponding to fields in the native document, the native document stored on a client device, the generating comprising:
generating field dimensions for the fields in the native document;
generating a field mapping of fields in the native document to table elements in the preview code;
generating a formula listing designating, for each formula of a set of formulas in the native document, one or more fields associated with the formula in the native document; and
displaying the preview document on a display by executing the preview code;
generating an updated preview document in response to a change to the native document;
swapping the updated preview document with the displayed preview document; and
applying a current user interaction context to the swapped updated preview document.

25. The non-transitory computer-readable storage medium of claim 24, wherein the executable computer instructions is further configured to cause the processor to:
receive a selection of a table element in the preview document;
identify a formula associated with the table element based on the field mapping and the formula listing; and
display the formula mapped to the selected table element as an input element.

26. The non-transitory computer-readable storage medium of claim 24, wherein the executable computer instructions is further configured to cause the processor to:
receive a modification of a table element from the user;
determine a target field associated with the modification using the field mapping; and
modify the target field in the native document with the modification.

27. The non-transitory computer-readable storage medium of claim 24, wherein swapping the updated preview document with the displayed preview document and applying the current user interaction context to the swapped preview document comprises:
rendering the updated preview document in a hidden portion of the display;
determining a context of the user's interaction with the native document as the current user interaction context;
swapping the updated preview document with the displayed preview document; and
applying the determined context to the swapped updated preview document.

* * * * *

UNITED STATES PATENT AND TRADEMARK OFFICE
CERTIFICATE OF CORRECTION

PATENT NO. : 10,013,396 B2
APPLICATION NO. : 14/609111
DATED : July 3, 2018
INVENTOR(S) : Daniel Horn et al.

Page 1 of 1

It is certified that error appears in the above-identified patent and that said Letters Patent is hereby corrected as shown below:

In the Claims

Claim 8, Column 13, Line 59, delete "the document version differs from the modification" and insert --the document version with the modification--.

Claim 22, Column 15, Line 30, delete "the document version differs from the modification" and insert --the document version with the modification--.

Claim 25, Column 16, Line 20, delete "instructions is" and insert --instructions are--.

Claim 26, Column 16, Line 29, delete "instructions is" and insert --instructions are--.

Signed and Sealed this
Fourth Day of December, 2018

Andrei Iancu
*Director of the United States Patent and Trademark Office*